United States Patent [19]
Isaka

[11] Patent Number: 5,986,565
[45] Date of Patent: Nov. 16, 1999

[54] INDIVIDUAL RECOGNITION SYSTEM

[75] Inventor: Isao Isaka, Izumi, Japan

[73] Assignee: Attention System Co., Ltd., Japan

[21] Appl. No.: 08/976,711

[22] Filed: Nov. 24, 1997

[51] Int. Cl.[6] ............................................. G06F 7/04
[52] U.S. Cl. .................. 340/825.33; 455/406; 455/407; 455/408; 455/409; 379/91; 235/379
[58] Field of Search ................. 340/825.33; 455/406, 455/407, 408, 409, 410, 415; 705/44, 18, 42; 235/382, 379; 902/10; 379/91

[56] References Cited

U.S. PATENT DOCUMENTS

| | | | |
|---|---|---|---|
| 5,625,669 | 4/1997 | McGregor et al. | 379/58 |
| 5,796,832 | 8/1998 | Kawan | 380/24 |

*Primary Examiner*—Michael Horabik
*Assistant Examiner*—Anthony A. Asongwed
*Attorney, Agent, or Firm*—Graham & James LLP

[57] ABSTRACT

An individual recognition system uses a mobile communication apparatus to more securely conduct financial data transactions. A call number stored in a mobile communications apparatus is read by a terminal unit and transmitted to a computer. The computer calls the mobile communications apparatus and requests a user to input a personal identification code. The personal identification code is transmitted from the mobile communications apparatus to the computer, so that the transmitted personal identification code is compared with a previously registered personal identification code for verification. As a result of verification, a registered person is confirmed. Then, a price of a purchase is input to the terminal unit and transmitted to the computer. Settlement for payment of the price of the purchase is carried out in a bank account.

3 Claims, 3 Drawing Sheets

INDIVIDUAL RECOGNITION SYSTEM

BACKGROUND OF THE INVENTION

1. Field of the Invention

This invention relates to an individual recognition system and more particularly, to various individual recognition systems which are utilized for a credit card, a cash card and other data transaction cards which require personal identification and user authorization.

2. Description of the Prior Art

Individual recognition procedures have been executed for various cards such as a cash card, a credit card and the like. Card operating firms issue cards and control card use via customers' information including registration of their bank account numbers, registration of their address and registration of their personal identification numbers and other suitable information. For example, upon shopping with a credit card, an individual recognition procedure is carried out by presentation of the credit card and signature of the cardholder's name so that the purchase can be completed. After that, the price of that purchase is paid from a customer's banking account, so that the settlement for the payment is completed.

In the case of a cash card or ATM card, the card is inserted into a terminal unit of a bank and a personal identification number is input into the terminal unit. The input personal identification number is verified with the personal identification number recorded in the card so as to conduct individual recognition and user authorization. After authorization is received, the customer can withdraw or deposit money. Further, in the case of the prepaid cash card, the cash card can be utilized instead of cash within a predetermined money value range.

Although individual recognition and user authorization is carried out mainly via a personal identification number or signature, recently such confirmation has been inadequate judging from recent increases in card theft and fraud. For example, a personal identification number is inclined to be selected according to an individual telephone number or birth date, so that it is likely to be deciphered easily. Further, in most cases, the personal identification number is recorded on a magnetic stripe formed on the card, so that information recorded in the magnetic stripe can be easily read. Although, the authenticity of a signature contained on the card is verified by comparison with a signature written by a customer at a point of sale, store clerks cannot confirm the authenticity of the signature absolutely because they are not specialists in handwriting and signature recognition and authentication. Anyone can pass a check or conduct a fraudulent credit card transaction easily by imitating a person's handwriting so as to write a similar signature.

Further, many firms issue respective cards such as credit card, cash card, prepaid card and the like. If a person tries to use these cards, he must use a plurality of separate, independent cards, so that it is troublesome to administer and use these cards. If improper use of a card is found or such a possibility is determined, it takes several days or months to take an appropriate countermeasure, thereby leading to expansion of fraud and loss of money.

SUMMARY OF THE INVENTION

To overcome the problems described above, the preferred embodiments of the present invention provide an individual recognition system capable of executing individual recognition securely and integrating various card functions effectively.

According to preferred embodiments of the present invention, there is provided an individual recognition system including a mobile communications apparatus having a memory for storing a call number or phone number; a terminal unit having a data reading device for reading the call number from the memory of the mobile communications apparatus and a data communication device; and a computer for storing the call number of the mobile communications apparatus and a personal identification code of a possessor of the mobile communications apparatus corresponding to the stored call number, wherein the call number stored in the memory of the mobile communications apparatus is read out by the data reading device of the terminal unit, then the call number is transmitted from the terminal unit to the computer by the data communications device, the mobile communications apparatus is called by the computer in accordance with the call number, then a personal identification code is entered by the user via the mobile communications apparatus and transmitted to the computer by using the mobile communications apparatus and the computer compares and attempts to verify the personal identification code entered by the user to the personal identification code stored in the computer corresponding to the call number, and a result of verification of the personal identification code by the computer is transmitted to the terminal unit.

This individual recognition system may be configured so that money value data is input to the terminal unit and the money value data is transmitted from the terminal unit to the computer after the computer has verified that a personal identification code stored in the computer coincides with a personal identification code transmitted from the mobile communications apparatus.

Further, the individual recognition system may be configured so that, after the computer has verified that the personal identification code stored in the computer coincides with the personal identification code transmitted from the mobile communications apparatus, cash is received or paid at the terminal unit and money value data of the received or paid cash is transmitted from the terminal unit to the computer.

A call number stored in the mobile communications apparatus is read by the terminal unit, and that particular mobile communications apparatus is called by the computer. As a result, the personal identification code input by a user via the mobile communications apparatus is recognized by the computer. At this time, by inputting a personal identification code via the mobile communications apparatus, the input personal identification code is compared to and is verified with the personal identification code stored in the computer. Thus, the personal identification code does not have to be stored in the mobile communications apparatus. Thus, there is no way to know or obtain others' personal identification code from the mobile communications apparatus.

The terminal unit may be a terminal unit for carrying out individual recognition, provided at each store or each point of sale. In this case, a price of a purchased product is input to the terminal unit and transmitted to the computer. Further, other types of the terminal unit may include an automatic teller machine in bank or other financial transaction terminals. In this case, money value data concerning payment and deposit of cash is transmitted to the computer.

According to preferred embodiments of the present invention, it is possible to call a registered user via a mobile communications device so that the user's identity and authorization can be verified and a data transaction approved.

Thus, this enables recognition of an individual person securely with high security. Further, this enables integration of various card functions.

These and other elements, features, and advantages of the preferred embodiments of the present invention will be apparent from the following detailed description of the preferred embodiments of the present invention, as illustrated in the accompanying drawings.

DETAILED DESCRIPTION OF PREFERRED EMBODIMENTS

Figure 1:
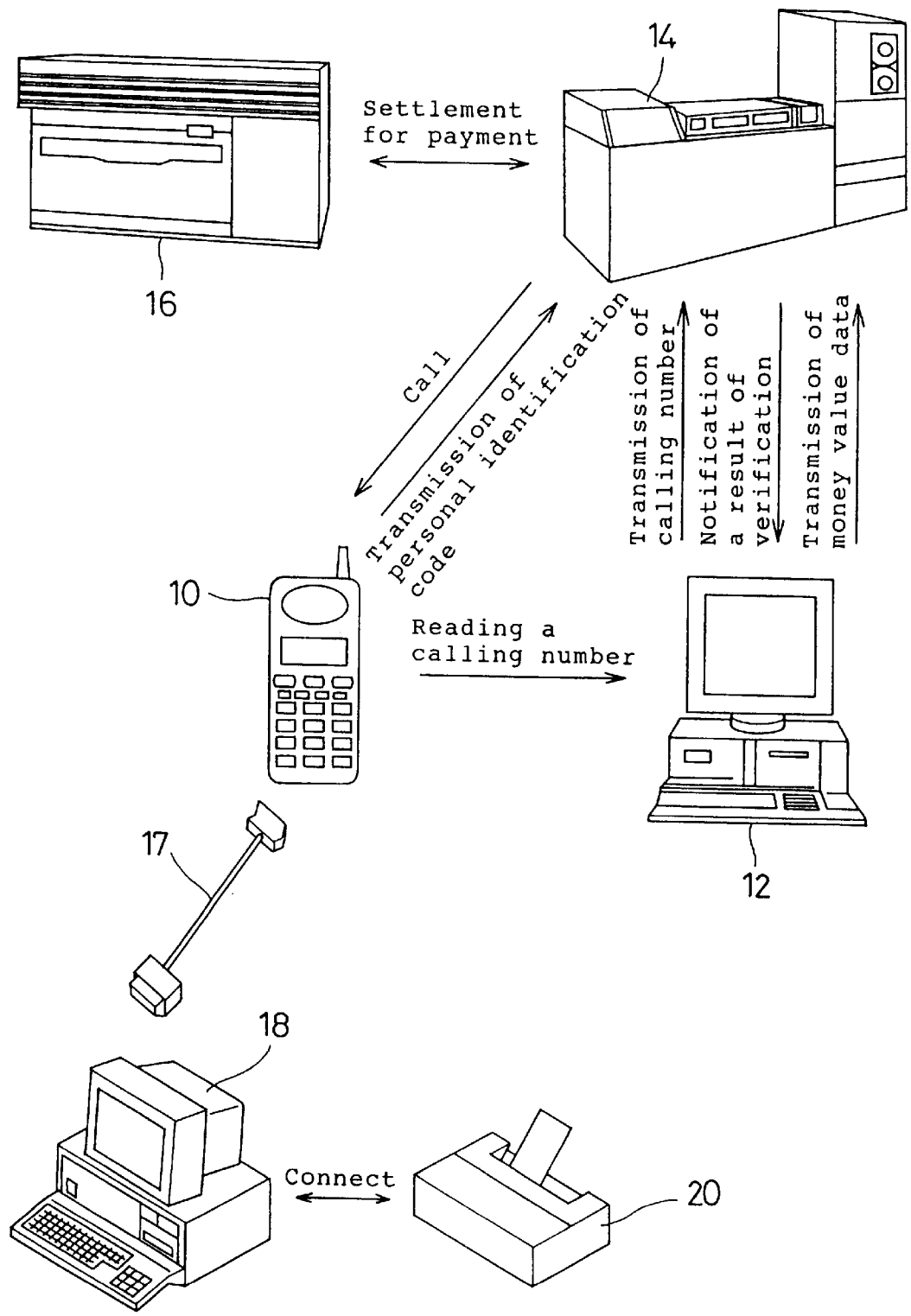
FIG. 1 is an explanatory view showing an example in which the individual recognition system according to a preferred embodiment of the present invention is used in the form of a credit card.

FIG. 1 is an explanatory view showing an example of shopping by using an individual recognition system according to a preferred embodiment of the present invention. Assume that a person carries a mobile communications apparatus 10 such as a mobile telephone. The mobile communications apparatus 10 contains a memory in which a call number for calling the mobile communications apparatus 10 is stored.

A terminal unit 12 for recognizing an individual person is provided at each store. The terminal unit 12 contains a data communication device and is capable of communicating with a computer 14, which supervises the individual recognition system. The data communication device may transmit data via known contact and contactless data communication protocols and methods. The computer 14 is preferably provided in a data card issuing and operating firm or the like. The terminal unit 12 has a data reading device for reading the call number stored in the memory of the mobile communications apparatus 10.

The computer 14 stores call numbers of individual persons' mobile communications apparatus and their personal identification codes in a correlated condition. The personal identification code may be composed of only numerals or a combination of alphabetic characters and symbols. The greater number of the numerals and symbols to be used for creating the personal identification code, the more combinations thereof are available, thereby making it more difficult to decipher the personal identification code, thus enhancing the security.

When a person buys anything at a store, the mobile communications apparatus 10 is operatively connected to the terminal unit 12 at that store. This operative connection can be achieved via contact or contactless communication, as is known. In one example, the connection is established by providing a holder for holding the mobile communications apparatus 10. By setting the mobile communications apparatus 10 on the holder, a connection terminal provided in the mobile communications apparatus 10 may be connected to a connection terminal provided in the holder. Then, the holder is connected to the terminal unit 12, and the mobile communications apparatus 10 is connected to the terminal unit 12 through the holder.

When the mobile communications apparatus 10 is connected to the terminal unit 12, the terminal unit 12 reads a call number stored in the memory of the mobile communications apparatus 10. This call number is transmitted to the computer 14 through the transmission line or via contactless communication. The computer 14 calls a mobile communications apparatus 10 of a person attempting to make a purchase in accordance with the sent call number. When the user responds to that calling, the computer 14 prompts the user to input an appropriate personal identification code. If the user inputs the personal identification code into the mobile communications apparatus 10 in response to the request of the computer 14, the personal identification code is sent to the computer 14. Because the call number of the mobile communications apparatus 10 and its possessor's personal identification code are registered in a correlated condition in the computer 14, the input personal identification code is verified with the registered personal identification code stored in the computer 14. If those personal identification codes coincide with each other, it is determined and verified that the possessor of that mobile communications apparatus 10 is a registered person and notifies the terminal unit 12 of this verification. After confirming that the possessor of the mobile communications apparatus 10 is the registered person, a price is input into the terminal unit 12. At this time, the possessor of the mobile communications apparatus 10 only has to determine whether the input price is correct.

The store in which the purchase is made receives a payment for such purchase from the card operating firm. The card operating firm receives a payment corresponding to the input purchase value, from a banking account of the possessor of the mobile communications apparatus 10, so that a settlement for the purchase is completed. Needless to say, various conveniences such as bulk payment for next month and payment via installment are freely available, like in the case of the conventional credit card.

Because the computer 14 stores shopping information, a user can obtain related information from the computer 14 by connecting the personal computer 18 to the mobile communications apparatus 10 through a connection cord 17 or via contactless communication. Further, by connecting a printer 20 to the personal computer 18, a user can print information obtained from the computer 14.

Figure 2:
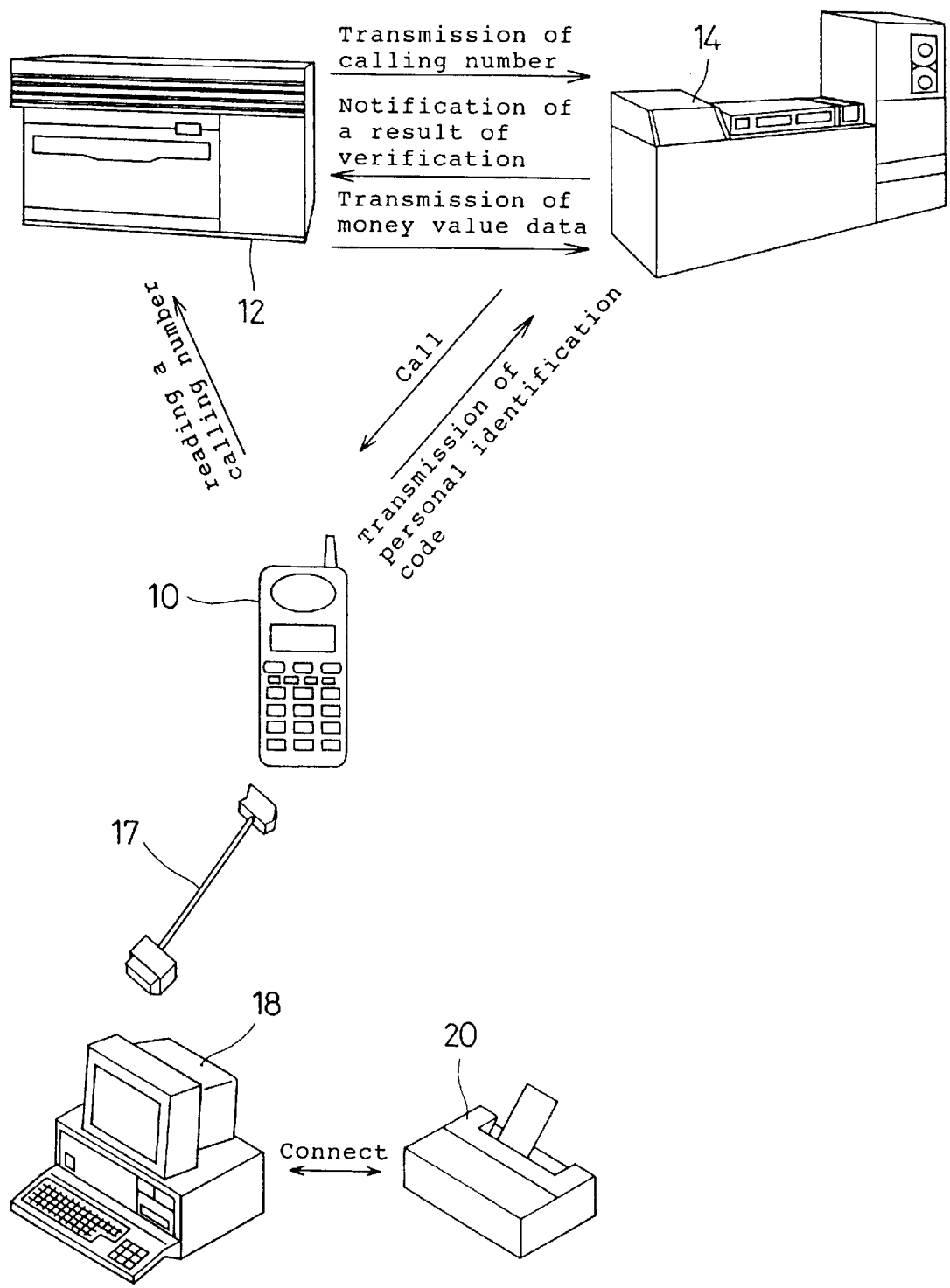
FIG. 2 is an explanatory view showing an example in which the individual recognition system according to a preferred embodiment of the present invention is used in the form of a cash card.

FIG. 2 is an explanatory view showing a case in which the individual identification system according to preferred embodiments of the present invention is utilized in an automatic teller machine in a bank. In this case, a depositor sets the mobile communications apparatus 10 to the terminal unit 12 of the automatic teller machine so as to operatively connect the apparatus 10 to the terminal unit 12. The terminal unit 12 reads a call number stored in the memory of the mobile communications apparatus 10, and the number is transmitted to the computer 14. The computer 14 calls the mobile communications apparatus 10 of the depositor in accordance with that call number, and requests the user to input a personal identification code. Then, the depositor inputs a personal identification code into the mobile communications apparatus 10 in accordance with the request from the computer 14. The input personal identification code is transmitted to the computer 14. The computer 14 verifies the received personal identification code with a previously registered personal identification code so as to confirm whether the user is a registered or authorized user. After it is confirmed that the user is a registered person, the result is sent to the terminal unit 12, so that deposit or payment is allowed. Then, by inputting a payment value into the terminal unit 12, the user can receive payment of cash. Needless to say, the user can deposit money as well.

Such data transaction information is stored in the computer 14. Thus, the user can obtain the data transaction information from the computer 14 by connecting a personal computer 18 to the transmission line or via contactless communication. Further, if the user connects a printer 20 to the personal computer 18, the user can print the data transaction information. As a result, the user can use the information as an account book.

Figure 3:
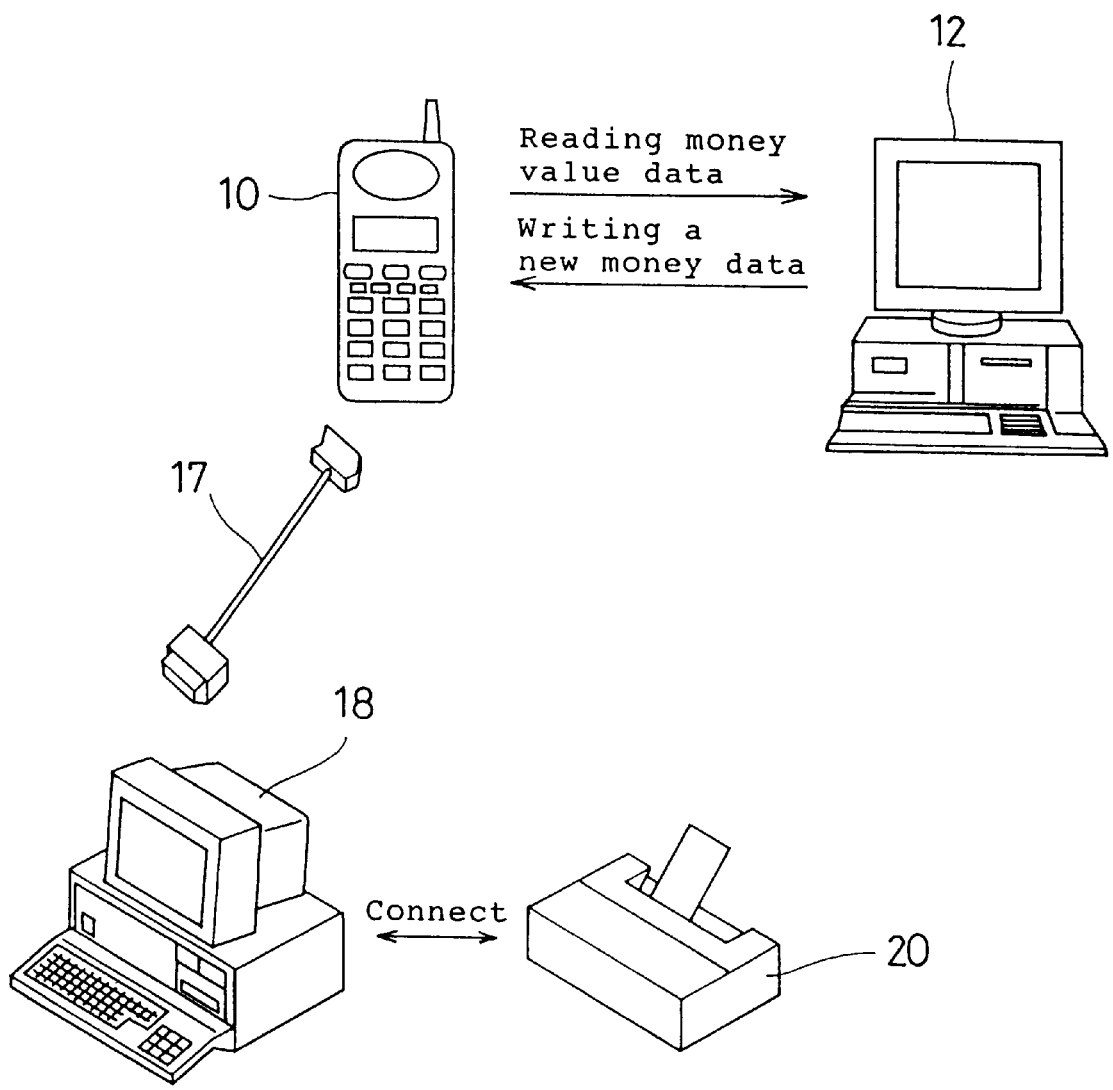
FIG. 3 is an explanatory view showing an example in which the individual recognition system according to a preferred embodiments of the present invention is used in the form of a prepaid card.

FIG. 3 is an explanatory view showing a preferred embodiment in which the mobile communications apparatus 10 for use in the individual recognition system according to the present invention is provided with a prepaid card function. In this case, the mobile communications apparatus 10 contains a memory for recording money values as data. When a user buys something using this mobile communications apparatus 10, the mobile communications apparatus 10 is operatively connected to the terminal unit 12 installed at a store. The terminal unit 12 reads money value data from the memory of the mobile communications apparatus 10, and the price of the item or items being purchased is subtracted from that money value data. Then, money value data from which the price is subtracted is written into the memory of the mobile communications apparatus 10. Thus, in a subsequent purchase transaction, the user can purchase an item or items within that reduced money value.

The individual recognition system is available not only as a prepaid card by recording money value data in the memory of the mobile communications apparatus 10, but also in every sector of data card business such as a seal-impression register card, an individual ID card, an individual membership card, a driving license, a passport, a health insurance card and the like.

In this individual recognition system, the computer 14 stores a call number of the mobile communications apparatus 10 of each person and the user's personal identification code in a correlated condition. When the call number for calling the mobile communications apparatus 10 is sent from the terminal unit 12, the computer 18 calls a registered person and that registered person inputs a personal identification code into the mobile communications apparatus 10. As a result, the input personal identification code is verified with a personal identification code stored in the computer 14. Thus, the personal identification code does not have to be stored in the mobile communications apparatus 10. Thus, if the mobile communications apparatus 10 is stolen, there is no danger that any personal identification code may be known.

Further, use of this individual recognition system enables calling of the mobile communications apparatus 10 by means of the computer 14 provided in a computer center or the like so as to directly confirm a person, although another confirmation in the conventional credit card system may also be carried out through visual signature verification or the like in each store. Thus, it is possible to improve security and crime such as forgery, modification, improper use and the like.

Use of this individual recognition system enables to provide a single mobile communications apparatus 10 with card functions such as credit card, cash card, prepaid card and the like. Thus, it is possible to integrate various card functions.

Although the present invention has been explained in detail and illustrated, it is apparent that these explanation and illustration are only an example of the explanation of the present invention, and the present invention is not restricted to these. The spirit and scope of the present invention are restricted by only descriptions in the attached claims.

What is claimed is:

1. An individual recognition system comprising:

a mobile communications apparatus having a memory for storing a call number of the mobile communications apparatus;

a terminal unit having a data reading device for reading said call number from said memory and including a data communication device; and a computer for storing said call number and a personal identification code of a possessor of said mobile communications apparatus in a correlated condition;

wherein said call number stored in said memory of said mobile communications apparatus is read out by said data reading device of said terminal unit, then said call number is transmitted from said terminal unit to said computer, said mobile communications apparatus is called from said computer in accordance with said call number, then a personal identification code is transmitted to said computer by using said mobile communications apparatus to be verified with said personal identification code stored in said computer in said correlated condition with said call number, and a result of verification of said personal identification code by said computer is transmitted to said terminal unit.

2. An individual recognition system according to claim 1 wherein, when said personal identification code stored in said computer coincides with said personal identification code transmitted from said mobile communications apparatus, money value data is input to said terminal unit and, then said money value data is transmitted from said terminal unit to said computer.

3. An individual recognition system according to claim 1 wherein, when said personal identification code stored in said computer coincides with said personal identification code transmitted from said mobile communications apparatus, cash is received or paid at said terminal unit and money value data of the received or paid cash is transmitted from said terminal unit to said computer.

* * * * *